(12) United States Patent
Liu et al.

(10) Patent No.: US 6,434,310 B1
(45) Date of Patent: Aug. 13, 2002

(54) SINGLE MODE OPTICAL WAVEGUIDE FIBER WITH REDUCED DISPERSION

(75) Inventors: Yanming Liu, Lexington, MA (US); Shiva Kumar, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/974,532

(22) Filed: Oct. 9, 2001

Related U.S. Application Data (60) Provisional application No. 60/239,563, filed on Oct. 11, 2000.

(51) Int. Cl.$^7$ .................................................. G02B 6/16
(52) U.S. Cl. ...................................... 385/123; 359/159
(58) Field of Search ................................. 385/123–126, 385/128, 28, 127; 65/144; 359/159

(56) References Cited

U.S. PATENT DOCUMENTS

| | | | |
|---|---|---|---|
| 4,641,917 A | * 2/1987 | Glodis et al. | 359/173 |
| 4,715,679 A | 12/1987 | Bhagavatula | 350/96.33 |
| 4,733,940 A | * 3/1988 | Broer et al. | 385/123 |
| 5,032,001 A | * 7/1991 | Shang | 385/124 |
| 5,203,897 A | * 4/1993 | Powers et al. | 65/144 |
| 5,361,319 A | * 11/1994 | Antos et al. | 385/123 |
| 5,448,674 A | * 9/1995 | Vengsarkar et al. | 385/128 |
| 5,613,027 A | 3/1997 | Bhagavatula | 385/123 |
| 5,649,044 A | 7/1997 | Bhagavatula | 385/124 |
| 5,715,346 A | 2/1998 | Liu | 385/124 |
| 5,748,824 A | 5/1998 | Smith | 385/124 |
| 5,781,673 A | * 7/1998 | Reed et al. | 359/159 |
| 6,185,346 B1 | * 2/2001 | Asawa et al. | 385/28 |
| 6,275,638 B1 | * 8/2001 | Sasaoka et al. | 385/127 |

* cited by examiner

*Primary Examiner*—Akm E. Ullah
(74) *Attorney, Agent, or Firm*—William J. Chervenak

(57) ABSTRACT

A single mode optical waveguide fiber having a relatively large effective area and low dispersion includes a segmented core having at least two segments each defining a radius, a refractive index profile and a relative refractive index percent. The waveguide fiber also includes a clad layer surrounding and in contact with the core and having a relative refractive index. The refractive index profiles are selected to provide total dispersion at a wavelength of about 1550 nm of within the range of about 11 ps/nm-km to about 14 ps/nm-km, and total dispersion slope at a wavelength of about 1550 nm of within the range of about 0.045 ps/nm$^2$-km to about 0.055 ps/nm$^2$-km. The refractive index profiles are further selected to provide an effective area greater than or equal to 60 $\mu$m$^2$, and attenuation at a wavelength of about 1550 nm of less than or equal to 0.22 dB/km.

23 Claims, 3 Drawing Sheets

SINGLE MODE OPTICAL WAVEGUIDE FIBER WITH REDUCED DISPERSION

CROSS-REFERENCES TO RELATED APPLICATIONS

This application claims the benefit of and priority to U.S. Provisional Patent Application Number 60/239,563, filed Oct. 11, 2000.

BACKGROUND OF THE INVENTION

1. Field of the Invention

The invention is directed to a single mode optical waveguide fiber for use in telecommunication systems and more particularly, a waveguide fiber which reduces non-linear dispersion effects, and combines low attenuation with a large effective area.

2. Technical Background

Wavelength division multiplexing techniques are typically required in telecommunication systems used in metropolitan area networks. Data rates in such systems are high so that the bandwidth demand is great to provide high capacity transmission capabilities. The single mode optical waveguide fiber that has been the primary fiber employed for use within metropolitan area networks has significant drawbacks since it cannot be used with direct modulation DFB (distributed feedback) lasers which are less expensive and easier to manufacture. Using a directly modulation DFB laser causes degradation in signal quality due to significant linear dispersion as well as non-linear dispersion effects. Thus, the more costly externally modulated transmitters or electro-absorption DFB lasers must be used.

To provide a suitable waveguide fiber for a multiplex transmission, the total dispersion should be low, but not zero, and have a low slope over the window of operating wavelengths. Maintaining the total dispersion non-zero over the operating wavelength band limits the non-linear dispersion effect of four wave mixing.

Several other non-linear optical effects must be considered when designing a waveguide fiber in order to reduce dispersion and yet be compatible for use with direct modulation DFB lasers utilizing multiplexing techniques. These non-linear optical effects include four-wave mixing, self phase modulation, cross phase modulation, and non-linear scattering.

Generally, an optical waveguide fiber having a large effective area, $A_{eff}$, reduces non-linear optical effects, including self phase modulation, four wave mixing, cross phase modulation, and non-linear scattering processes, all of which can cause degradation of signals in systems utilizing multiplexing techniques. A waveguide fiber having a segmented core can generally provide a large effective area while limiting the non-linear optical effects.

The mathematical description of these non-linear effects includes the ratio, $P/A_{eff}$, where P is the optical power. For example, a non-linear optical effect can be described by an equation containing a term, $\exp[P \times L_{eff}/A_{eff}]$, where $L_{eff}$ is effective length. Thus, an increase in $A_{eff}$ produces a decrease in the non-linear contribution to the degradation of a light signal.

The requirement in the telecommunication industry for greater information capacity and reduced cost of light sources, such as the directly modulated DFB lasers, has led to a reevaluation of single mode optical waveguide fiber index profile design. The focus of this reevaluation has been to provide optical waveguides which:

reduce non-linear effects such as those noted above;
have lower dispersion than standard single mode fibers;
may be used with all band wavelength division multiplexing applications with low-water peak attenuation;
are compatible with 1310 nm systems; and
retain the desirable properties of waveguides such as high strength, fatigue resistance, and bending resistance.

Waveguide designs which also are relatively easy to manufacture and which permit management of dispersion are favored, because of their low cost and added flexibility. The designs described herein are well suited to a dispersion managing strategy in which the waveguide dispersion is varied along the waveguide fiber length to cause the total dispersion to alternate between positive and negative values.

U.S. Pat. No. 4,715,679, to Bhagavatula, incorporated herein by reference as if fully set forth herein in its entirety, discloses and describes the concept of adding structure to the waveguide fiber core by means of core segments, having distinct profiles to provide flexibility in waveguide fiber design. The segmented core concept can be used to achieve unusual combinations of waveguide fiber properties, such as those described herein.

SUMMARY OF THE INVENTION

This invention meets the need for a singe mode optical waveguide fiber that offers the benefits of a relatively lower total dispersion (the sum of waveguide and material dispersion) with a relatively large effective area.

The invention relates to a single mode optical waveguide fiber including a segmented core. Each of the segments is described by a refractive index profile, a relative refractive index percent, and an inner and an outer radius. The optical waveguide fiber further includes a clad layer surrounding and in contact with the core, and having a refractive index profile.

In a preferred embodiment, the index profiles are selected to provide total dispersion at a wavelength of about 1550 nm of within the range of about 11 ps/nm-km to about 14 ps/nm-km, total dispersion slope at a wavelength of about 1550 nm of within the range of about 0.045 ps/nm$^2$-km to about 0.055 ps/nm$^2$-km, an effective area greater than or equal to 60 $\mu$m$^2$, and attenuation at a wavelength of about 1550 nm of less than or equal to 0.22 dB/km.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

Definitions

The following definitions are commonly used in the art.

The radii of the segments of the core are defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius from the waveguide center line to the location of its first refractive index point is the inner radius of that segment. Likewise, the radius from the waveguide center line to the location of the last refractive index point of the segment is the outer radius of that segment. The radii of the segments may be conveniently defined in a number of ways. In this application, radii are defined in accord with the figures, described in detail below.

The definitions of segment radius and refractive index, used to describe refractive index profile, in no way limits the invention. Definitions are provided herein because in carrying out model calculations, consistent terminology must be used. The model calculations set forth in the tables below are made using the geometrical definitions labeled in the figures and described in the detailed description.

The effective area is generally defined as, $$A_{eff}=2\pi(\int E^2 r\, dr)^2/(\int E^4 r\, dr),$$

wherein the integration limits are zero to ∞, and E is the electric field associated with the propagated light.

The mode field diameter, $D_{mf}$, is measured using the Peterman II method wherein, $$2w=D_{mf} \text{ and } w^2=(2\int E^2 r\, dr/\int [dE/dr]^2 r\, dr),$$

the integral limits being 0 to ∞.

The relative index of a segment, Δ%, as used herein, is defined by the equation, $$\Delta\%=100\times(n_i-n_c)/n_c,$$

where $n_i$ is the maximum refractive index of the index profile segment denoted as i, and $n_c$, the reference refractive index, is taken to be the minimum index of the clad layer. Every point in the segment has an associated relative index. The maximum relative index is used to conveniently characterize a segment whose general shape is known.

The term refractive index profile or index profile is the relation between Δ% or refractive index and radius over a selected segment of the core.

The term alpha profile refers to a refractive index profile that may be expressed by the equation, $$n(r)=n_o(1-\Delta[r/a]^\alpha),$$

where r is core radius, Δ is defined above, a is the last point in the profile segment, the value of r at the first point of the α-profile is chosen to accord with the location of the first point of the profile segment, and α is an exponent which defines the profile shape. Other index profiles include a step index, a trapezoidal index and a rounded step index, in which the rounding is usually due to dopant diffusion in regions of rapid refractive index change.

Total dispersion is defined as the algebraic sum of waveguide dispersion and material dispersion. Total dispersion is also referred to as chromatic dispersion in the art. The units of total dispersion are ps/nm-km.

A refractive index profile in general has an associated effective refractive index profile that is different in shape. An effective refractive index profile may be substituted, for its associated refractive index profile without altering the waveguide performance.

The bend resistance of a waveguide fiber is expressed as induced attenuation under prescribed test conditions. The bend test referenced herein is the pin array bend test that is used to compare relative resistance of waveguide fiber to bending. To perform the test, attenuation loss is measured for a waveguide fiber with essentially no induced bending loss. The waveguide fiber is then woven in a serpentine path through the pin array and attenuation again measured. The loss induced by bending is the difference between the two measured attenuation values. The pin array is a set of ten cylindrical pins arranged in a single row and held in a fixed position on a flat surface. The pin spacing is 5 mm, center to center. The pin diameter is 0.67 mm. During testing, sufficient tension is applied to make the serpentine woven waveguide fiber conform to the portions of the pin surface at which there is contact between the pin and the fiber.

Figures 5, 6:
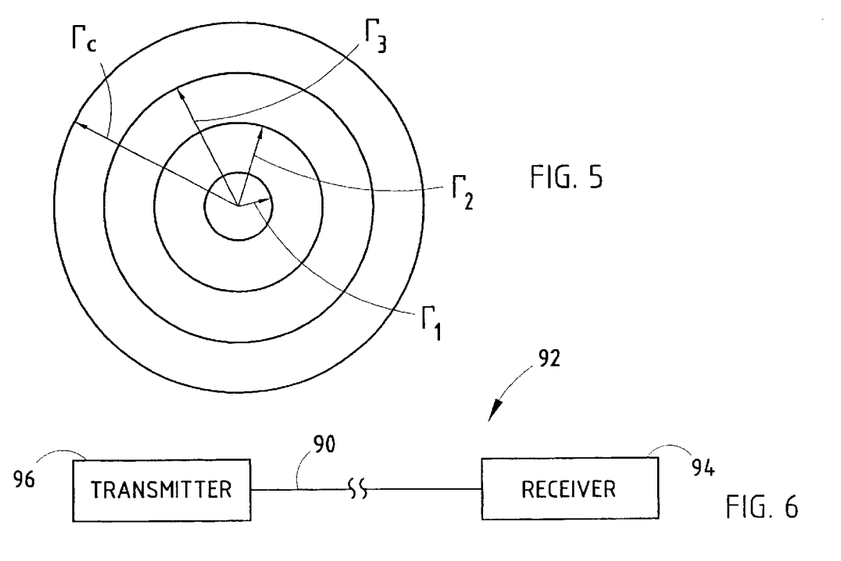
FIG. 5 is a schematic cross-sectional view of a novel optical waveguide fiber of the present invention.
FIG. 6 is a schematic view of a fiber optic communication system employing an optical fiber of the present invention.

The segmented core optical waveguide described and disclosed herein has a generally segmented core. Each of the segments is described by a refractive index profile, relative refractive index percent, $\Delta_i\%$, and an outside radius, $r_i$ (FIG. 5). (The inner radius of a segment is either the center line, in the case of the central segment, or the outer radius of the preceding segment, where the counting of segments begins at the centerline of the waveguide and proceeds outward.) The subscript i on r and Δ refers to a particular segment. The segments are numbered 1 through n beginning with the innermost segment which includes the waveguide long axis centerline. A clad layer having a refractive index of $n_c$ surrounds the core.

The radius, relative refractive index percent, and refractive index profile of each segment of the core are selected to provide: attenuation at 1550 nm no greater than 0.22 dB/km; zero dispersion wavelength in the range of about 1270 nm to about 1350 nm; total dispersion at 1550 nm in the range of about 11.0 ps/nm-km to about 14.0 ps/nm-km; a dispersion slope at 1550 nm of within the range of about 0.045 ps/nm²-km to about 0.055 ps/nm²-km effective area greater than 60 μm² at 1550 nm; cutoff wavelength of fiber in cabled form less than about 1280 nm; and, polarization mode dispersion of within the range of about 0.1 ps/√km to about 0.25 ps/√km. The novel segmented core design of this application displays the required properties cataloged above.

Figure 1:
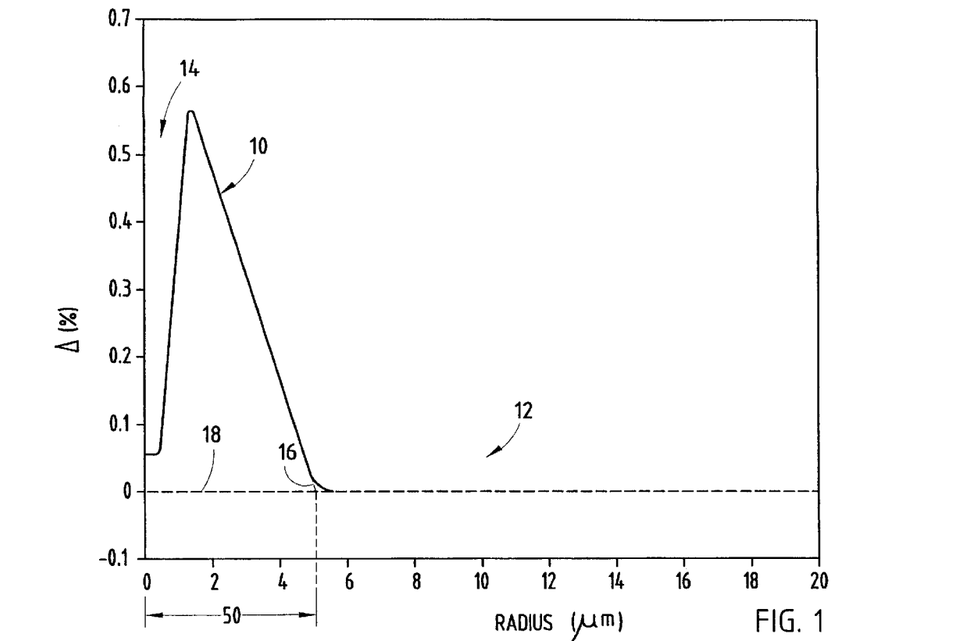
FIG. 1 is a diagram of the waveguide fiber refractive index profile of an optical waveguide having a single segment core.

A general representation of the core refractive index profile is illustrated in FIG. 1, which shows relative refractive index percent charted versus waveguide radius. Although FIG. 1 shows only a single segment core, it is understood that the functional requirements may be met by forming a core having more than a single segment. However, embodiments having fewer segments are usually easier to manufacture and are therefore preferred.

Index profile structure characteristic of the novel waveguide fiber is shown by core segment 10 having a positive $\Delta\%$. Central segment 10 of the illustrated waveguide fiber core has an $\alpha$-shaped profile. The refractive index profile may be adjusted to reach a core design which provides the required waveguide fiber properties.

Figure 2:
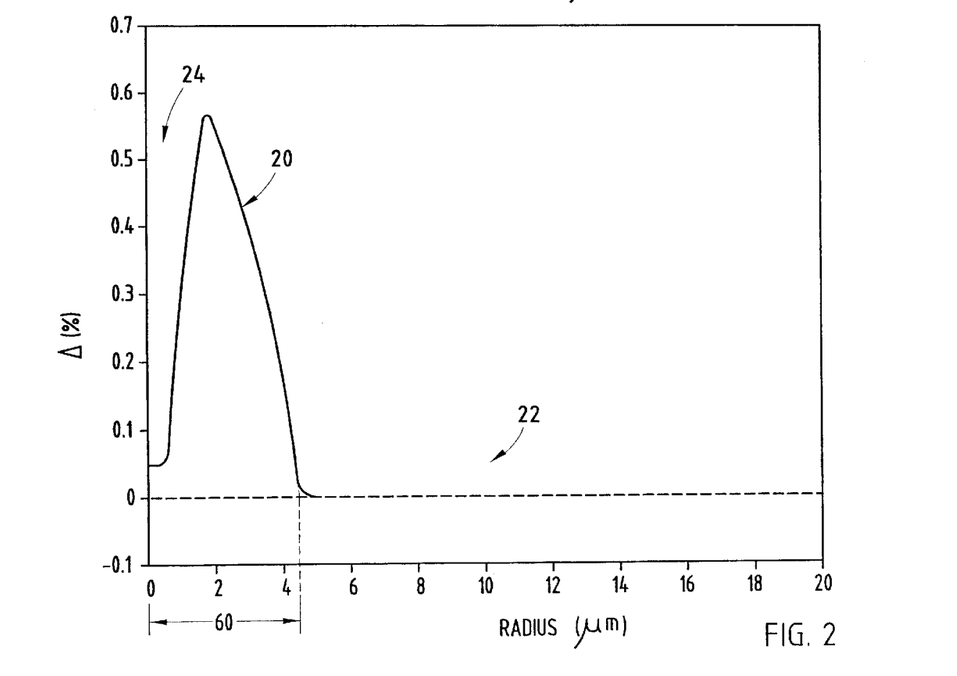
FIG. 2 is a diagram of the waveguide fiber refractive index profile of an alternative optical waveguide having a single segment core.

FIG. 2 illustrates another single segment variation of the novel waveguide fiber core design. In this design, the novel waveguide fiber includes a central core segment 20 which has an $\alpha$-shaped profile.

Figure 3:
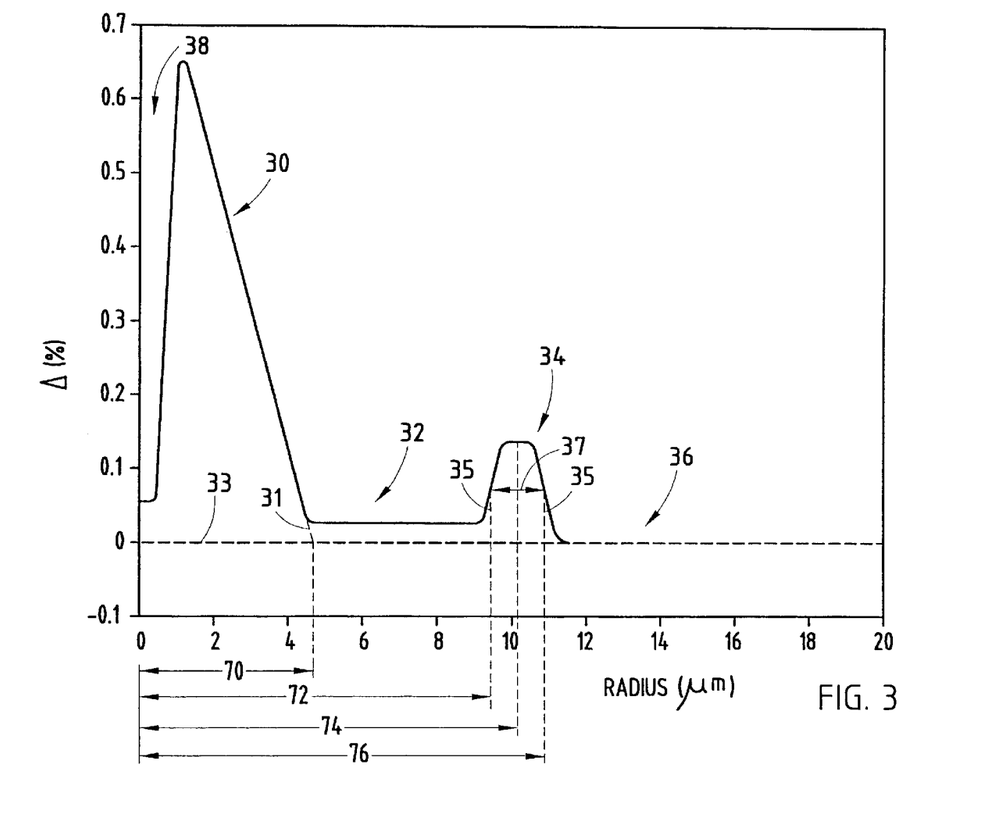
FIG. 3 is a diagram of a waveguide fiber refractive index profile of an optical waveguide having a three-segment core.

FIG. 3 illustrates a three segment core variation of the novel waveguide fiber core design. In this design, the core of the novel waveguide fiber includes a central segment 30, a first annular segment 32 which surrounds and is adjoining to central segment 30, and a second annular segment 34 which surrounds and is adjoining to first annular segment 32. Central segment 30 has an $\alpha$-shaped profile, while first annular segment 32 and second annular segment 34 each have step-shaped profiles.

Figure 4:
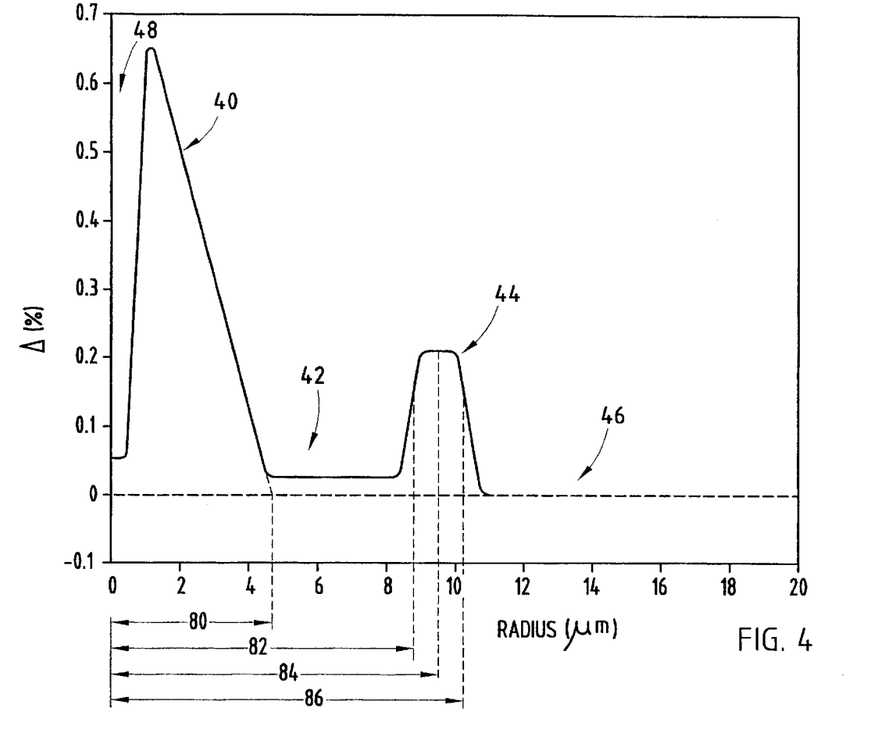
FIG. 4 is a diagram of the waveguide fiber refractive index profile of an alternative optical waveguide having a three-segment core.

FIG. 4 illustrates another three segment core variation of the novel waveguide fiber core design. In this case, the core is provided a central segment 40, a first annular segment 42, and a second annular segment 44. Central segment 40 has an $\alpha$-shaped profile, while first annular segment 42 and second annular segment 44 each have step shaped profiles. The properties associated with each of the above embodiments vary from one another as discussed in the examples below.

It should be noted that lines 12, 22, 36 and 46, of the respective FIGS. 1, 2, 3 and 4, represent the refractive index of the cladding which is used to calculate the $\Delta\%$'s characteristic of the segments. Further, the rounding of the corners of the profiles of FIGS. 1, 2, 3 and 4, as well as the center line refractive index depressions 14, 24, 38 and 48, respectively, may be due to diffusion of dopant during manufacturing of waveguide fiber. It is possible, but often not necessary, to compensate for such diffusion, for example, in the doping step. The computer model can be adjusted to take into account profile rounding. Such adjustment is made in those cases where the rounding results in a significant change in calculated fiber properties.

EXAMPLE 1

The diagram of FIG. 1 is an embodiment of the novel waveguide core having a single central segment 10 and an inner cladding 12. The central core or first segment 10 has a relative index, $\Delta_1$, of about 0.66%, and an outer radius 50, $r_1$, (FIG. 5) of about 4.7 $\mu$m. The outer radius, $r_1$, of the central segment 10 is also the inner radius of the inner cladding 12. The radius $r_1$, therefore, is the intersection of the central segment 10 and the inner cladding 12. In this case, the intersection point is defined as the intersection of the extrapolated descending portion of the index profile of the central segment 10, represented by line 16, with the horizontal axis 18, defined as the axis through the most negative point or points of the refractive index profile, which in the illustrated example is 0%.

The properties of the waveguide fiber of FIG. 1, calculated using a computer model, are given in Table 1.

TABLE 1

| | |
|---|---|
| Zero-dispersion wavelength (nm) | 1315 |
| Dispersion slope (ps/nm²-km) | 0.057 |
| Mode field diameter ($\mu$m) | 9.44 |
| Effective area ($\mu$m²) | 67.8 |
| Cable cutoff wavelength (nm) | 1149 |
| Pin array bending loss (dB) | 6.6 |
| Attenuation (dB/km) | 0.201 |

In this example, the effective area is about 67.8 $\mu$m², the pin array bend loss is about 6.6 dB, and the attenuation of the resultant waveguide is about 0.201 dB/km.

EXAMPLE 2

Another example of the novel waveguide having a central segment 20, is shown in FIG. 2. In this example, central segment 20 has a positive relative index, $\Delta_1\%$, of about 0.57. The radii for the second embodiment are calculated using the conventions set forth in Example 1. The radius 60, $r_1$, of the central segment 20 is about 4.2 $\mu$m.

Table 2 sets forth the calculated properties of the FIG. 2 refractive index profile.

TABLE 2

| | |
|---|---|
| Zero-dispersion wavelength (nm) | 1306 |
| Dispersion slope (ps/nm²-km) | 0.057 |
| Mode field diameter ($\mu$m) | 9.55 |
| Effective area ($\mu$m²) | 71.8 |
| Cable cutoff wavelength (nm) | 1178 |
| Pin array bending loss (dB) | 7.64 |
| Attenuation (dB/km) | 0.206 |

In this example, the effective area is about 71.8 $\mu$m², the pin array bending loss is about 7.64 dB, and the attenuation of the resultant waveguide is about 0.206 dB/km.

EXAMPLE 3

The following table includes another example of refractive index profile of a single segment core waveguide that yields the desired waveguide performance targets.

TABLE 3

| | |
|---|---|
| Core delta (%) | 0.450 |
| Core radius ($\mu$m) | 3.500 |
| Zero-dispersion wavelength (nm) | 1312.4 |
| Dispersion slope (ps/nm²-km) | 0.056 |
| Mode field diameter ($\mu$m) | 9.549 |
| Effective area ($\mu$m²) | 70.62 |
| Cabled cutoff wavelength (nm) | 705 |
| Pin array bending loss (dB) | 12.79 |
| Attenuation (dB/km) | 0.204 |

EXAMPLE 4

The diagram of FIG. 3 is an example of the novel waveguide core having three segments 30, 32 and 34, and an inner cladding 36. The central core or first segment 30 has a relative index, $\Delta_1$, of about 0.66%, and an outer radius 70, $r_1$, of about 4.43 $\mu$m. The first surrounding annular segment or second segment 32 has a relative index, $\Delta_2\%$, of about 0.025 percent. The outer radius 70, $r_1$, of the central segment 30 is also the inner radius of the first annular segment 32. This convention will be used consistently in all of the remaining examples and corresponding figures. The outer radius 70 $r_1$, therefore, is the intersection of the central segment and the first annular segment. In this case, the intersection point is defined as the intersection of the extrapolated descending portion of the index profile of the central segment 30, represented by line 31, with the horizontal axis 33, defined as the axis through the most negative point or points of the refractive index profile, which in the illustrated example is 0%.

The outer radius 72, $r_2$, of the first annular segment 32, is about 9.635 μm and is measured from the fiber centerline to the vertical line depending from the half maximum relative index point of the ascending portion of second annular segment 34. The half maximum point is determined using the clad layer, i.e., Δ%=0 as reference. For example, in FIG. 3, second annular segment has a relative index $\Delta_3$% of about 0.128%, thus, relative to the Δ%=0 of the clad layer, the magnitude is about 0.128%. Dashed vertical lines 35 depend from the 0.064% points, which are half of the magnitude of $\Delta_3$%. The center radius 74 of the second annular segment is about 10.4 μm, while the outer radius, $r_3$, 76 of the second annular segment is about 11.165 μm. The final segment of the profiles disclosed and described herein has its position defined in terms of a center radius (the radius from the centerline to the geometric center of the segment profile) and the width, defined as the distance between the half magnitudes of the relative index profile. Throughout the application, this definition of segment width is maintained. The width 37 of the second annular segment 34 is about 1.53 μm. The relative index of the inner cladding is 0%.

The properties of the waveguide fiber of FIG. 3, calculated using a computer model, are given in Table 4.

TABLE 4

| Zero-dispersion wavelength (nm) | 1322 |
| Dispersion slope (ps/nm²-km) | 0.057 |
| Mode field diameter (μm) | 9.43 |
| Effective area (μm²) | 70 |
| Cable cutoff wavelength (nm) | 1533 |
| Pin array bending loss (dB) | 2.0 |
| Attenuation (dB/km) | 0.209 |

In this example, the effective area is about 70 μm², the pin array bend loss is about 2.0 dB, and the attenuation of the resultant waveguide is about 0.209 dB/km.

EXAMPLE 5

Another example of the novel waveguide having three segments, including a central segment 40, a second segment or first annular segment 42, and a third segment or second annular segment 44, is shown in FIG. 4. In this example, central segment 40 has a relative index of about 0.66%, first annular segment 42 has a relative index of about 0.025%, and second annular segment 44 has a relative index of about 0.212%. The inner cladding 46 has a relative index of 0%.

The radii for the second embodiment are calculated using the conventions set forth in Example 4. The radius 80, $r_1$, of the central segment 40 is about 4.21 μm. The outer radius 82, $r_2$, of the first annular segment 42 is about 8.87 μm. The center radius 84 of the second annular segment is about 9.69 μm, while the outer radius 86, $r_3$, for the second annular segment 44 is about 10.51 μm.

Table 5 sets forth the calculated properties of the FIG. 4 refractive index profile.

TABLE 5

| Zero-dispersion wavelength (nm) | 1317 |
| Dispersion slope (ps/nm²-km) | 0.055 |
| Mode field diameter (μm) | 9.69 |
| Effective area (μm²) | 67 |
| Cable cutoff wavelength (nm) | 1721 |
| Pin array bending loss (dB) | 0.5 |
| Attenuation (dB/km) | 0.210 |

In this example, the effective area is about 67 μm², the pin array bending loss is about 0.5 dB, and the attenuation of the resultant waveguide is about 0.210 dB/km.

The following Table 6 includes Examples 6–16 that effectively define the family of refractive index profiles of segmented core waveguides that yield the desired waveguide performance targets. The convention for defining radii used throughout the application is maintained in Table 6. For example, the radius of the final annular segment is understood to be the center radius and a segment width is defined as the distance between the half magnitude points of the segment relative index profile.

TABLE 6

|  | Ex. 6 | Ex. 7 | Ex. 8 | Ex. 9 | Ex. 10 | Ex. 11 |
| --- | --- | --- | --- | --- | --- | --- |
| Central segment delta (%) | 0.460 | 0.470 | 0.470 | 0.460 | 0.460 | 0.460 |
| Central segment radius (μm) | 3.900 | 3.900 | 3.900 | 3.900 | 3.900 | 3.900 |
| First annular segment delta (%) | 0.025 | 0.050 | 0.020 | 0.025 | 0.025 | 0.025 |
| Second annular segment delta (%) | 0.150 | 0.200 | 0.200 | 0.200 | 0.200 | 0.200 |
| Second annular segment radius (outer or center) (μm) | 9.000 | 9.000 | 10.000 | 9.000 | 9.000 | 9.000 |
| Second annular segment width (μm) | 3.000 | 2.000 | 2.000 | 2.000 | 2.000 | 2.000 |
| Third annular segment delta (%) | 0.03 | — | — | — | 0.00 | 0.03 |
| Third annular segment radius (center) (μm) | 12.0 | — | — | — | 16.00 | 12.00 |
| Third annular segment width (μm) | 3.0 | — | — | — | 12.0 | 4.0 |
| Zero-dispersion wavelength (nm) | 1309.4 | 1306.0 | 1283.1 | 1304.4 | 1305.4 | 1306.9 |
| Dispersion slope (ps/nm²-km) | 0.055 | 0.057 | 0.054 | 0.055 | 0.055 | 0.055 |
| Mode field Diameter (μm) | 9.471 | 9.507 | 9.144 | 9.410 | 9.425 | 9.443 |
| Effective area (μm²) | 70.62 | 68.76 | 64.01 | 67.50 | 67.64 | 67.88 |
| Cabled cuttoff wavelength (nm) | 1207 | 1204 | 1005 | 1156 | 1155 | 1195 |
| Pin array Bending loss (dB) | 0.57 | 0.34 | 0.50 | 0.55 | 0.57 | 0.58 |
| Attenuation (dB/km) | 0.197 | 0.208 | 0.203 | 0.197 | 0.197 | 0.197 |

TABLE 6-continued

|  | Ex. 12 | Ex. 13 | Ex. 14 | Ex. 15 | Ex. 16 |
| --- | --- | --- | --- | --- | --- |
| Central segment delta (%) | 0.460 | 0.410 | 0.410 | 0.410 | 0.410 |
| Central segment radius ($\mu$m) | 3.900 | 3.900 | 3.900 | 3.900 | 3.900 |
| First annular segment delta (%) | 0.025 | 0.025 | 0.025 | 0.025 | 0.025 |
| Second annular segment delta (%) | 0.150 | 0.150 | 0.150 | 0.150 | 0.150 |
| Second annular segment radius (outer or center) ($\mu$m) | 9.000 | 9.000 | 9.000 | 9.000 | 9.000 |
| Second annular segment width ($\mu$m) | 3.000 | 3.000 | 2.500 | 2.000 | 2.000 |
| Third annular segment delta (%) | 0.03 | 0.03 | 0.03 | 0.03 | 0.03 |
| Third annular segment radius (center) ($\mu$m) | 12.00 | 12.00 | 12.00 | 12.00 | 11.00 |
| Third annular segment width ($\mu$m) | 3.0 | 3.0 | 3.5 | 4.0 | 2.0 |
| Zero-dispersion wavelength (nm) | 1309.4 | 1334.6 | 1325.6 | 1317.6 | 1316.8 |
| Dispersion slope (ps/nm$^2$-km) | 0.055 | 0.058 | 0.058 | 0.057 | 0.057 |
| Mode field diameter ($\mu$m) | 9.471 | 10.166 | 10.060 | 9.972 | 9.961 |
| Effective area ($\mu$m$^2$) | 68.23 | 78.06 | 76.42 | 75.09 | 74.94 |
| Cabled cuttoff Wavelength (nm) | 1207 | 1197 | 1147 | 1096 | 1075 |
| Pin array Bending loss (dB) | 0.57 | 3.24 | 3.29 | 3.31 | 3.28 |
| Attenuation (dB/km) | 0.197 | 0.195 | 0.195 | 0.195 | 0.195 |

The profiles of FIGS. 1–4 are members of a group of profiles that exhibit similar performance to those set forth in Tables 1–6. The group of refractive index profiles in accord with FIGS. 1–4 and that have substantially similar functional parameters have relative indexes in the respective ranges of about 0.35% to about 0.55% for the central segment, $\Delta_1$%, of about 0% to about 0.1% for the first annular segment, $\Delta_2$%, of about 0.1% to about 0.2% for the second annular segment, $\Delta_3$%, and about 0% to about 0.3% for the third annular segment. The corresponding radii of the group are in the respective ranges of about 3.5 $\mu$m to about 4.5 $\mu$m for $r_1$, about 8.0 $\mu$m to about 10.0 $\mu$m for the center radius of the second annular segment, and about 11.0 $\mu$m to about 16.0 $\mu$m for the center radius of the third annular segment.

As shown in FIG. 6, and in accordance with the present invention, an optical fiber 90 is manufactured in accordance with the present invention and used in an optical fiber communication system 92. System 92 includes a receiver 94 and a transmitter 96, wherein optical fiber 90 allows transmission of an optical signal between transmitter 96 and receiver 94. In most systems, each end of fiber 90 will be capable of 2-way communication, and transmitter 96 and receiver 94 are shown for illustration only.

The refractive indices and the cross sectional profile of the fibers made according to the present invention can be accomplished using manufacturing techniques known to those skilled in the art including, but in no way limited to, OVD and MCVD processes.

It will become apparent to those skilled in the art that various modifications to the preferred embodiment of the invention as described herein can be made without departing from the spirit or scope of the invention as defined by the appended claims.

The invention claimed is:

1. A single mode optical waveguide fiber, comprising:
 a segmented core having a central segment defining a radius, a refractive index profile, and a relative refractive index percent; and
 a clad layer surrounding and in contact with the core and defining a radius, and having a refractive index profile and a relative refractive index percent; and
 wherein the refractive index profiles are selected to provide:
 total dispersion at a wavelength of about 1550 nm of within the range of about 11 ps/nm-km to about 14 ps/nm-km;
 total dispersion slope at a wavelength of about 1550 nm of within the range of about 0.045 ps/nm$^2$-km to about 0.055 ps/nm$^2$-km;
 effective area greater than or equal to about 60 $\mu$m$^2$; and
 attenuation at a wavelength of about 1550 nm of less than or equal to about 0.22 dB/km.

2. The single mode optical fiber of claim 1, wherein the index profile is further selected to provide a polarization mode dispersion of within the range of about 0.01 ps/$\sqrt{\text{km}}$ to about 0.25 ps/$\sqrt{\text{km}}$.

3. The single mode optical fiber of claim 2, wherein the index profile is further selected to provide a cabled cutoff of about 1280 nm.

4. The single mode optical fiber of claim 3, wherein the index profile is further selected to provide a mode field diameter of within the range of about 9.0 $\mu$m to about 10.2 $\mu$m.

5. The single mode optical fiber of claim 4, wherein the c or e includes a first annular segment adjoining the central segment.

6. The single mode optical fiber of claim 5, wherein the core includes a second annular segment adjoining the first annular segment.

7. The single mode optical fiber of claim 6, wherein at least one of the segments of the core has an $\alpha$-profile.

8. The single mode optical fiber of claim 7, wherein the central segment has an $\alpha$-profile, the first annular segment has a step profile, and the second annular segment has a step profile.

9. The single mode optical fiber of claim 8, wherein the core includes a third annular segment adjoining the second annular segment.

10. The single mode optical fiber of claim 9, wherein the central segment, and the first, second and third annular segments, each have a step profile.

11. The single mode optical fiber of claim 10, wherein the relative refractive index of every segment of the core is positive.

12. The single mode optical fiber of claim 11, wherein at least one of the segments of the core has an $\alpha$-profile.

13. The single mode optical fiber of claim 12, wherein the core segment has an $\alpha$-profile, the first annular segment has a step profile, the second annular segment has a step profile, and the third annular segment has a step profile.

14. The single mode optical fiber of claim 13, wherein the relative refractive index of every segment of the core is positive.

15. A single mode optical waveguide fiber, comprising:

a segmented core having a central segment defining a radius, a refractive index profile, and a relative refractive index percent; and a clad layer surrounding and in contact with the core and defining a radius, and having a refractive index profile and a relative refractive index percent; and wherein the radius and relative refractive index percent of the central segment are chosen from the following ranges:

the relative index of the central segment within the range of from about 0.35% to about 55%; and the outer radius of the central segment within the range of from about 3.5 μm to about 4.5 μm; and wherein the refractive index profiles are selected to provide:

total dispersion at a wavelength of about 1550 nm of within the range of about 11 ps/nm-km to about 14 ps/nm-km;

total dispersion slope at a wavelength of about 1550 nm of within the range of about 0.045 ps/nm²-km to about 0.055 ps/nm²-km;

effective area greater than or equal to about 60 μm²; and attenuation at a wavelength of about 1550 nm of less than or equal to about 0.22 dB/km.

16. A single mode optical waveguide fiber, comprising:

a segmented core having a central segment defining a radius, a refractive index profile, and a relative refractive index percent; and a clad layer surrounding and in contact with the core and defining a radius, and having a refractive index profile and a relative refractive index percent; and wherein the core includes a first annular segment surrounding the central segment and defining a relative refractive index percent, and an inner and outer radius, and wherein the radii and relative refractive index percent of the first annular segment is chosen from the following ranges:

the relative index of the first annular segment within the range of from about 0% to about 0.1%; and the outer radius of the first annular segment within the range of from about 6.0 μm to about 12.0 μm; and wherein the refractive index profiles are selected to provide:

total dispersion at a wavelength of about 1550 nm of within the range of about 11 ps/nm-km to about 14 ps/nm-km;

total dispersion slope at a wavelength of about 1550 nm of within the range of about 0.045 ps/nm²-km to about 0.055 ps/nm²-km;

effective area greater than or equal to about 60 μm²; and attenuation at a wavelength of about 1550 nm of less than or equal to about 0.22 dB/km.

17. A single mode optical waveguide fiber, comprising:

a segmented core having a central segment defining a radius, a refractive index profile, and a relative refractive index percent; and a clad layer surrounding and in contact with the core and defining a radius, and having a refractive index profile and a relative refractive index percent; and wherein the core includes a second annular segment surrounding the first annular segment and defining a relative refractive index percent, and an inner and outer radius, and wherein the radii and relative refractive index percent of the second annular segment are chosen from the following ranges:

the relative index of the second annular segment within the range of from about 0.1% to about 0.2%;

the center radius of the second annular segment within the range of from about 8.0 μm to about 10.0 μm; and the width of the second annular segment within the range of from about 0.5 μm to about 4.0 μm; and wherein the refractive index profiles are selected to provide:

total dispersion at a wavelength of about 1550 nm of within the range of about 11 ps/nm-km to about 14 ps/nm-km;

total dispersion slope at a wavelength of about 1550 nm of within the range of about 0.045 ps/nm²-km to about 0.055 ps/nm²-km;

effective area greater than or equal to about 60 μm²; and attenuation at a wavelength of about 1550 nm of less than or equal to about 0.22 dB/km.

18. A single mode optical waveguide fiber, comprising:

a segmented core having a central segment defining a radius, a refractive index profile, and a relative refractive index percent; and a clad layer surrounding and in contact with the core and defining a radius, and having a refractive index profile and a relative refractive index percent; and wherein the core further includes a third annular segment surrounding the second annular segment and having a relative refractive index percent and an inner and outer radius, and wherein the radius and relative refractive index percent of the third annular segment are chosen from the following ranges:

the relative index of the third annular segment within the range of from about 0% to about 0.03%;

the center radius of the third annular segment within the range of from about 10 μm to about 15 μm; and the width of the third annular segment within the range of from about 3.0 μm to about 12.0 μm; and wherein the refractive index profiles are selected to provide:

total dispersion at a wavelength of about 1550 nm of within the range of about 11 ps/nm-km to about 14 ps/nm-km;

total dispersion slope at a wavelength of about 1550 nm of within the range of about 0.045 ps/nm²-km to about 0.055 ps/nm²-km;

effective area greater than or equal to about 60 μm²; and attenuation at a wavelength of about 1550 nm of less than or equal to about 0.22 dB/km.

19. An optical fiber communication system, comprising:

a transmitter;

a receiver; and an optical waveguide fiber including a segmented core having a central segment defining a radius, a refractive index profile, and a relative refractive index percent, and a clad layer surrounding and in contact with the core and defining a radius, and having a refractive index profile and a relative refractive index percent; and wherein the refractive index profiles are selected to provide:

total dispersion at a wavelength of about 1550 nm of within the range of about 11 ps/nm-km to about 14 ps/nm-km;

total dispersion slope at a wavelength of about 1550 nm of within the range of about 0.045 ps/nm²-km to about 0.055 ps/nm²-km;

effective area greater than or equal to about 60 $\mu m^2$; and attenuation at a wavelength of about 1550 nm of less than or equal to about 0.22 dB/km.

20. The communication system of claim 19, wherein the radius and relative refractive index percent of the central segment of the optical waveguide fiber are chosen from the following ranges:

the relative index of the central segment within the range of from about 0.35% to about 0.55%; and the outer radius of the central segment within the range of from about 3.5 $\mu$m to about 4.5 $\mu$m.

21. The communication system of claim 19, wherein the core of the optical waveguide fiber includes a first annular segment surrounding the central segment and defining a relative refractive index percent, and an inner and outer radius, and wherein the radii and relative refractive index percent of the first annular segment is chosen from the following ranges:

the relative index of the first annular segment within the range of from about 0% to about 0.1%; and the outer radius of the first annular segment within the range of from about 6.0 $\mu$m to about 12.0 $\mu$m.

22. The communication system of claim 19, wherein the core of the optical waveguide fiber includes a second annular segment surrounding the first annular segment and defining a relative refractive index percent, and an inner and outer radius, and wherein the radii and relative refractive index percent of the second annular segment are chosen from the following ranges:

the relative index of the second annular segment within the range of from about 0.1% to about 0.2%;

the center radius of the second annular segment within the range of from about 8.0 $\mu$m to about 10.0 $\mu$m; and the width of the second annular segment within the range of from about 0.5 $\mu$m to about 4.0 $\mu$m.

23. The single mode optical fiber of claim 19, wherein the core of the optical waveguide fiber further includes a third annular segment surrounding the second annular segment and having a relative refractive index percent and an inner and outer radius, and wherein the radius and relative refractive index percent of the third annular segment are chosen from the following ranges:

the relative index of the third annular segment within the range of from about 0% to about 0.03%;

the center radius of the third annular segment within the range of from about 10 $\mu$m to about 15 $\mu$m; and the width of the third annular segment within the range of from about 3.0 $\mu$m to about 12.0 $\mu$m.

* * * * *